US009824233B2

(12) United States Patent
Kaplan et al.

(10) Patent No.: US 9,824,233 B2
(45) Date of Patent: Nov. 21, 2017

(54) POSIXLY SECURE OPEN AND ACCESS FILES BY INODE NUMBER

(71) Applicant: International Business Machines Corporation, Armonk, NY (US)

(72) Inventors: Marc A. Kaplan, Bethel, CT (US); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 14/943,948

(22) Filed: Nov. 17, 2015

(65) Prior Publication Data

US 2017/0140165 A1   May 18, 2017

(51) Int. Cl.
  *G06F 21/00*  (2013.01)
  *G06F 21/62*  (2013.01)
  *H04L 9/32*   (2006.01)

(52) U.S. Cl.
  CPC ........ *G06F 21/6218* (2013.01); *H04L 9/3213* (2013.01); *H04L 9/3242* (2013.01)

(58) Field of Classification Search
  CPC .. G06F 21/6218; H04L 9/3242; H04L 9/3213
  See application file for complete search history.

(56) References Cited

U.S. PATENT DOCUMENTS 5,941,947 A * 8/1999 Brown ................ G06F 21/6218
                                                      709/225
6,374,402 B1 * 4/2002 Schmeidler ............. G06F 21/10
                                                      348/E5.008

(Continued)

FOREIGN PATENT DOCUMENTS

CN   101567003 B    5/2012
WO   2015090668 A1  6/2015

OTHER PUBLICATIONS

Weil, S.A. et al., "Ceph: A Scalable, High-Performance Distributed File System", Proceedings of the 7th USENIX Symposium on Operating Systems Design and Implementation (OSDI '06), Nov. 2006, pp. 307-320, USENIX Association, United States.

(Continued)

*Primary Examiner* — Mahfuzur Rahman
(74) *Attorney, Agent, or Firm* — Sherman IP LLP; Kenneth L. Sherman; Steven Laut

(57) ABSTRACT

A method for secure portable operating system interface (POSIX) directory traversing for opening and accessing files by inode number. The method includes receiving, by a process executed by a processor, a request for a ticket for traversing a file system. The process generates a secure key for a unique handle object based on the request for the ticket. An authentication code is generated for the ticket using a numeric file identifier and the secure key. In response to reading a directory with POSIX x and r permissions according to directory permission bits or an access control list (ACL), the ticket is returned including ticket information including the numeric file identifier, generation information and the authentication code. In response to a request to open a directory, the ticket information is validated based on the secure key. A directory is opened for reading using the validated ticket information and the unique handle.

18 Claims, 7 Drawing Sheets

(56) References Cited

U.S. PATENT DOCUMENTS

| | | | | |
|---|---|---|---|---|
| 7,475,137 B2* | 1/2009 | Holden | ............... | G06F 21/31 |
| | | | | 709/219 |
| 8,352,941 B1* | 1/2013 | Protopopov | ........ | G06F 9/45558 |
| | | | | 718/1 |
| 8,892,531 B2 | 11/2014 | Kaplan | | |
| 9,553,843 B1* | 1/2017 | Smith | ............... | H04L 67/141 |
| 9,560,010 B1* | 1/2017 | Estes | ............... | H04L 63/0209 |
| 2007/0282951 A1* | 12/2007 | Selimis | ............... | H04L 67/06 |
| | | | | 709/205 |
| 2010/0138922 A1 | 6/2010 | Zaifman | | |
| 2012/0233668 A1* | 9/2012 | Leafe | ............... | G06F 9/44526 |
| | | | | 726/4 |
| 2013/0297610 A1 | 11/2013 | Devarakonda | | |
| 2013/0305057 A1* | 11/2013 | Greco | ............... | G06F 21/80 |
| | | | | 713/189 |

OTHER PUBLICATIONS

Anonymously, "Extending the Output Values of Storage ACLs to Control Restricted Access", Feb. 16, 2014, pp. 1-4, IP.com, United States.

Mell, P., et al., "The NIST Definition of Cloud Computing", National Institute of Standards and Technology Special Publication 800-145, Sep. 2011, pp. 1-7, U.S. Department of Commerce, United States.

* cited by examiner

POSIXLY SECURE OPEN AND ACCESS FILES BY INODE NUMBER

BACKGROUND

Embodiments of the invention relate to secure permission based directory traversal, in particular, for secure portable operating system interface (POSIX®) directory traversing for opening and accessing files by inode number.

POSIX® is a group of standards specified by the Institute of Electrical and Electronics Engineers (IEEE) Computer Society for maintaining compatibility between operating systems. POSIX® defines the application programming interface (API), and command line shells and utility interfaces, for software compatibility with variants of UNIX® and other operating systems. Information for a POSIX® file is stored in a structure referred to as an inode. Each file has its own inode, which has a mode that includes file permissions and the file type or a directory indication. The permissions are represented as "r" (read permission) "w" (write permission) and "x" (execute permission for executable files) for a user, group and for other. The user, group and other each have three bits. When traversing a directory, file system checks the permissions for directory and file access at each directory traversal and for each file. In order to overcome the permission checking of each directory and each file, some systems provide blanket permissions. By giving a blanket permission, several users or a group of users gain blanket permission to open and access any file by its inode number. Therefore, the file system either provides permission checking for each level in a directory traversal for each file, or blanket access permission.

SUMMARY

Embodiments of the invention relate to secure POSIX® directory traversing for opening and accessing files by inode number. In one embodiment, a method includes receiving, by a process executed by a processor, a request for a ticket for traversing a file system. The process generates a secure key for a unique handle object based on the request for the ticket. An authentication code is generated for the ticket using a numeric file identifier and the secure key. In response to reading a directory with POSIX® x and r permissions according to directory permission bits or an access control list (ACL), the ticket is returned including ticket information including the numeric file identifier, generation information and the authentication code. In response to a request to open a directory, the ticket information is validated based on the secure key. A directory is opened for reading using the validated ticket information and the unique handle.

These and other features, aspects and advantages of the present invention will become understood with reference to the following description, appended claims and accompanying figures.

DETAILED DESCRIPTION

Figure 1:
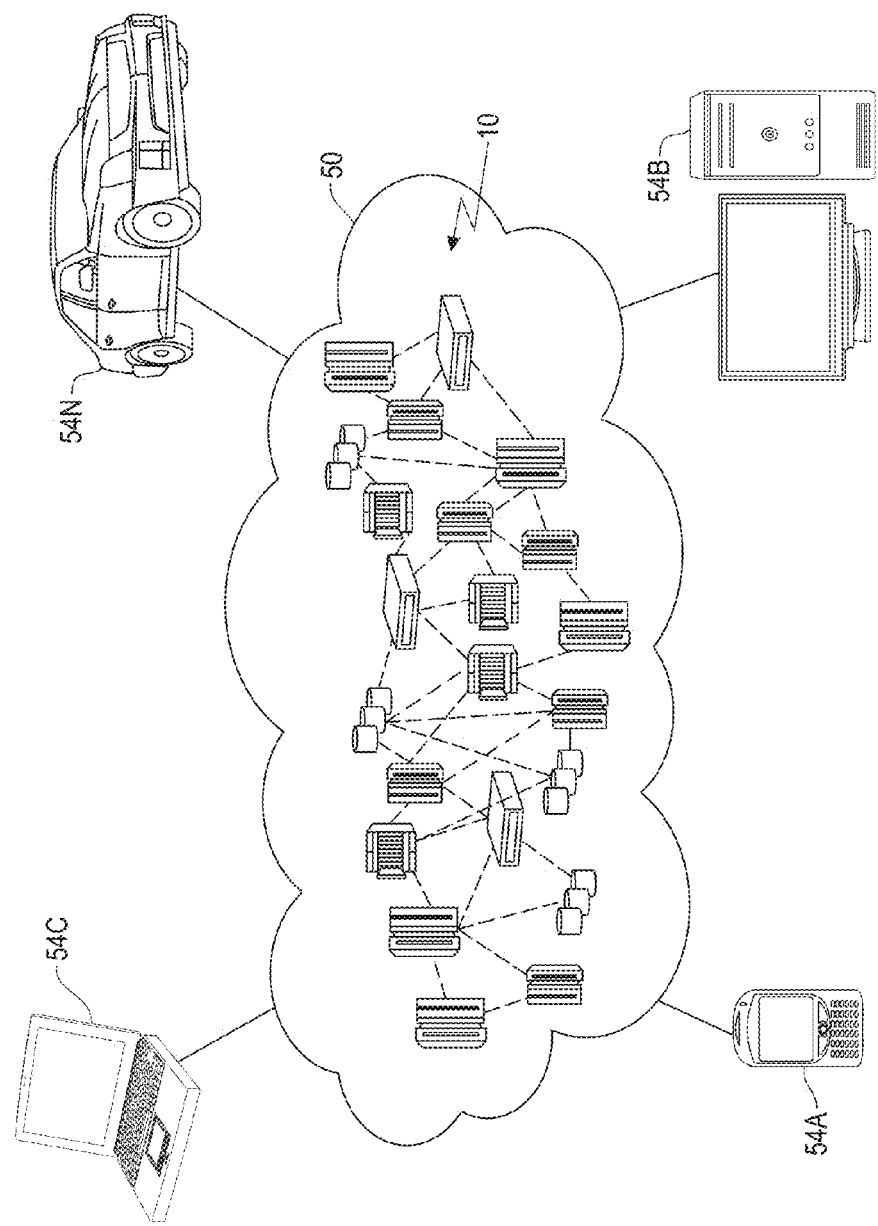
FIG. 1 depicts a cloud computing environment, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
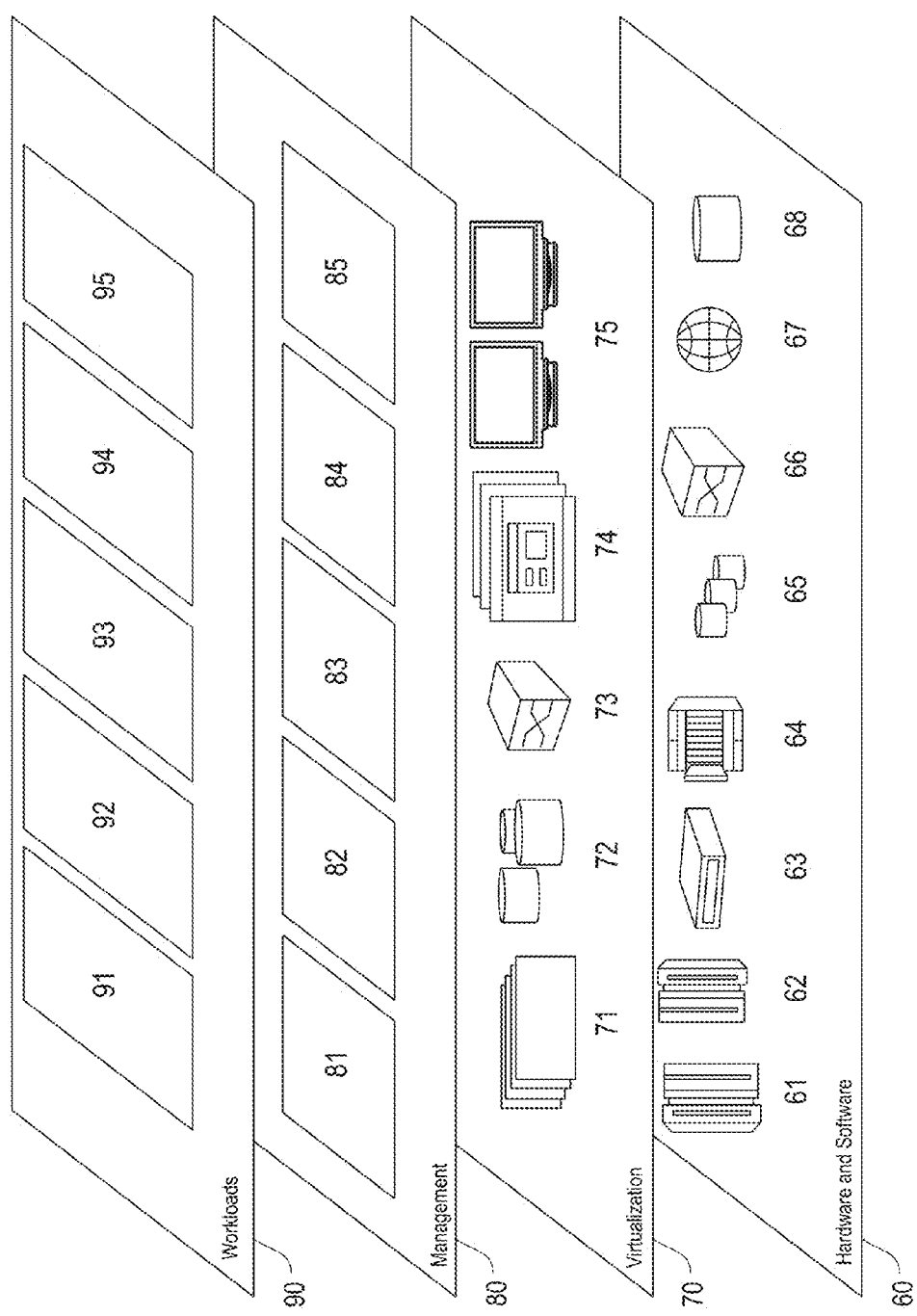
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed in the network 300 (FIG. 3), performed by the system 400 (FIG. 4), or performed by the processing system 500 (FIG. 5), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
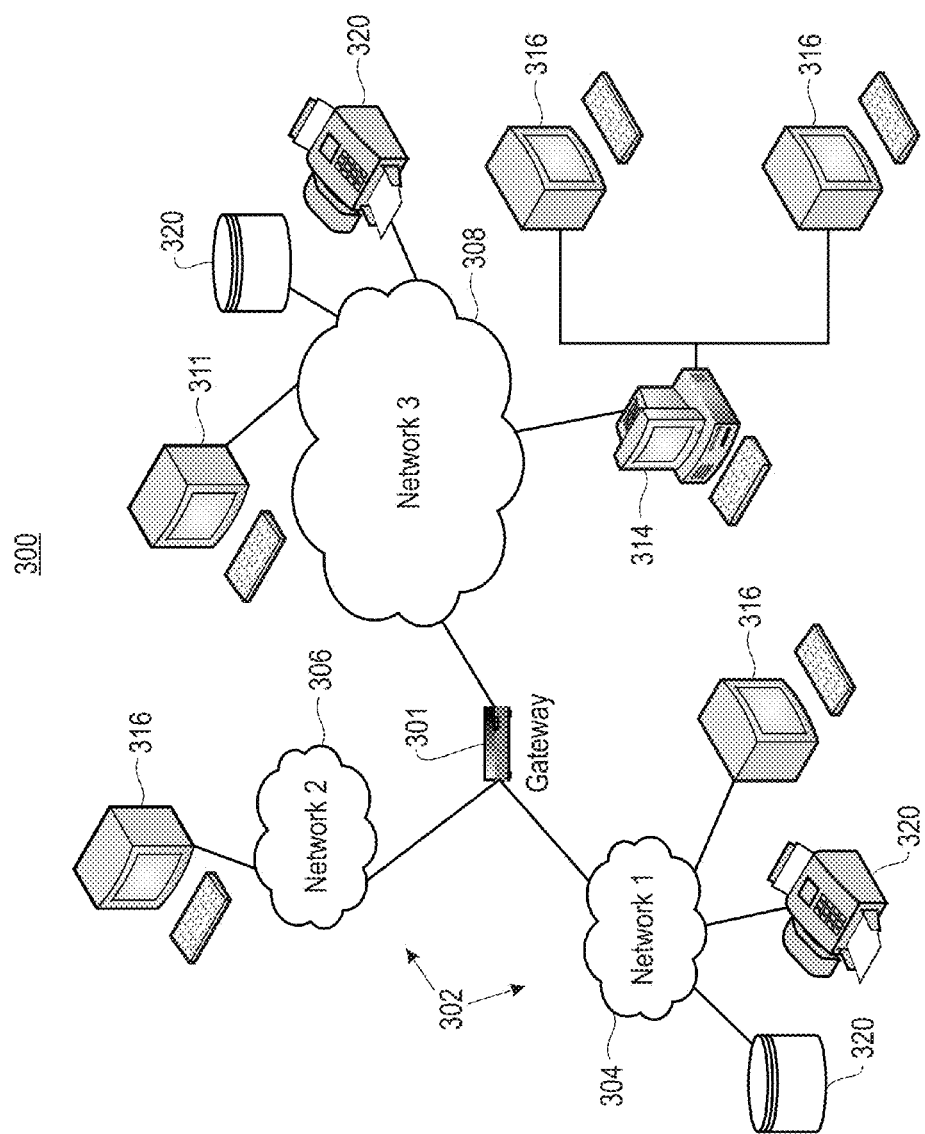
FIG. 3 is a network architecture for storing and recovering data for fast durability and quick journal-less recovery, according to an embodiment of the present invention.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

In one or more embodiments, the system 300 utilizes a process for secure POSIX® directory traversing for opening and accessing files by inode number. In one embodiment, a method includes receiving, by a process executed by a processor, a request for a ticket for traversing a file system. The process generates a secure and unique key (e.g., using a message authentication code (MAC) process, a cryptographic hash function, etc.) for a unique handle object based on the request for the ticket. An authentication code (or string) (e.g., a unique bit string, alphanumeric string, unique coding, etc.) is generated for the ticket using a numeric file identifier and the secure and unique key. In response to reading a directory with POSIX® x and r permissions according to directory permission bits or an access control list (ACL), the ticket is returned including ticket information including the numeric file identifier, generation information and the authentication code. In response to a request to open a directory, the ticket information is validated based on the ticket information and the secure key. A directory is opened for reading using the validated ticket information and the unique handle.

In one embodiment, for a POSIX® file system, a software security ticket is generated for a user who first locates the file by its path name but requires access to the file at later times more directly by the file's inode number. Use of the ticket allows a fast permission-to-access test without the need to traverse the path to the file through a file system tree of directories, yet offers security practically equivalent to the POSIX® security rule that the user must have permission to traverse each directory along the path. When processing many directories and files, one or more embodiments provides directory traversal operations to locate many files to be scheduled and completed well before the directories, files and/or their metadata (inode) are processed. This makes it feasible to re-order the processing steps required to process a huge number of files, to exploit the performance advantages possible by accessing data and metadata sequentially with respect to its location on or within storage media.

Figure 4:
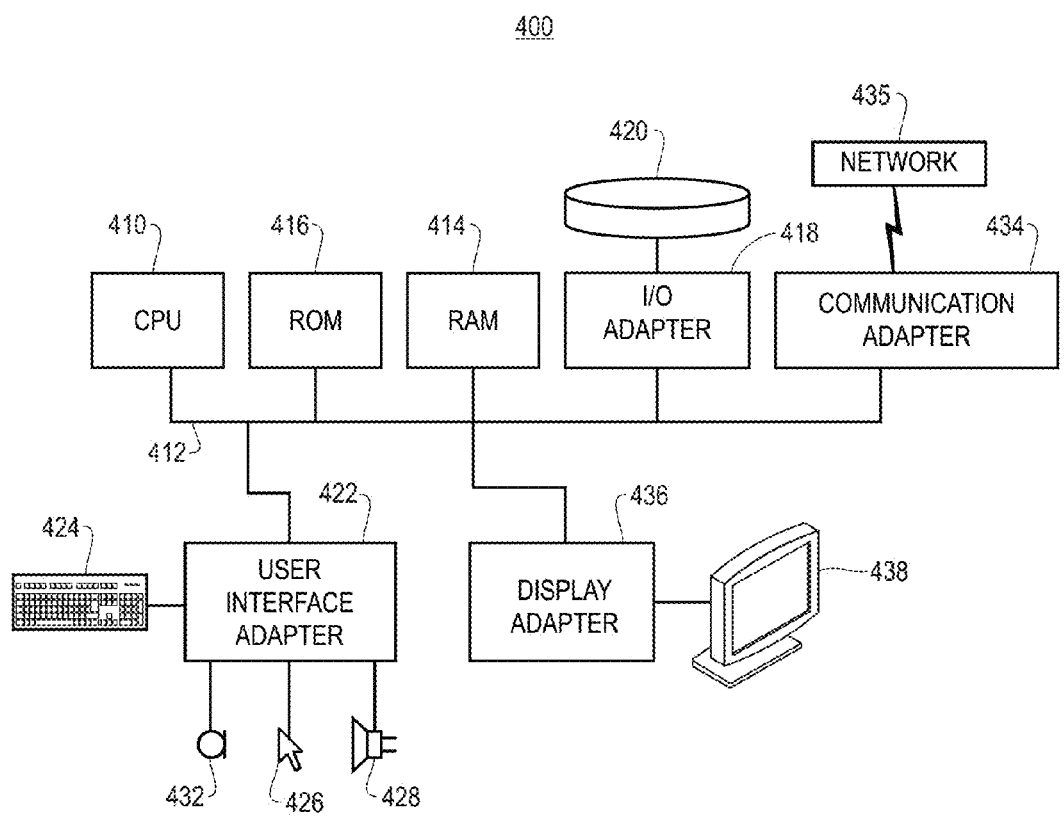
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
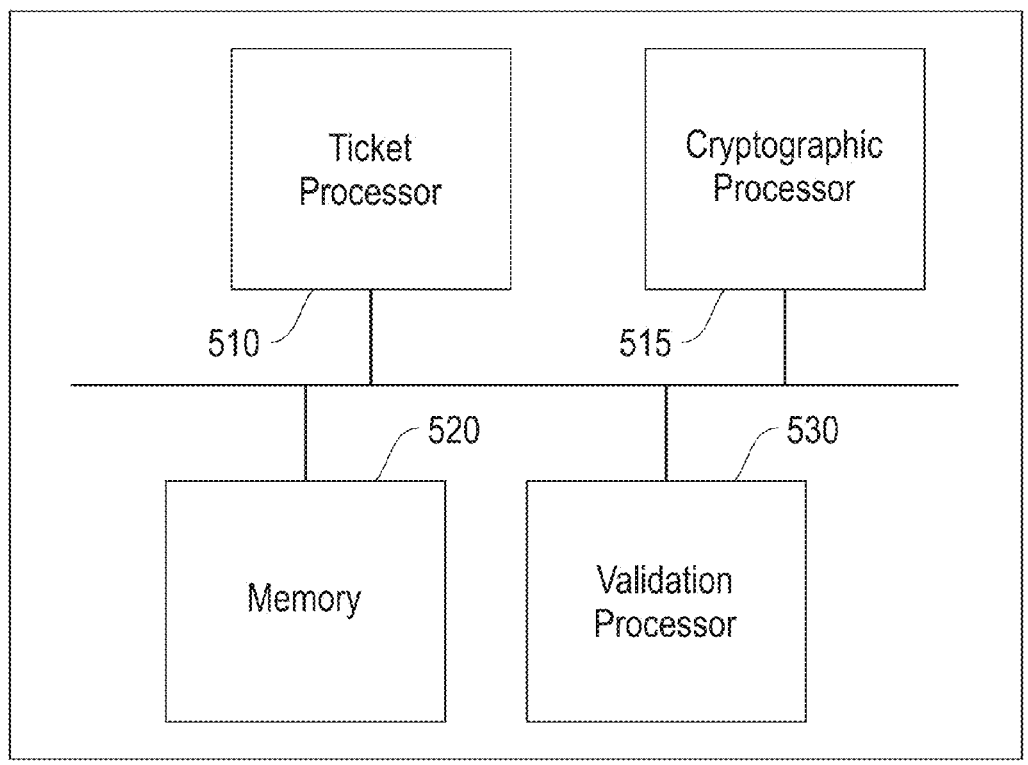
FIG. 5 is a block diagram illustrating a processing system for secure portable operating system interface (POSIX®) directory traversing for opening and accessing files by inode number, according to an embodiment.

FIG. 5 is a block diagram illustrating a processing system 500 (e.g., a computing system hardware processor device, a multiprocessor, compilation system processor, filing system processor, etc.) for secure POSIX® directory traversing for opening and accessing files by inode number, according to one embodiment. In one embodiment, the processing system 500 includes a ticket processor 510, a cryptographic processor 515, a memory device(s) 520 and a validation processor 530. In one embodiment, the processing system 500 is connected with one or more memory devices 520 (e.g., storage disk devices, storage systems, distributed file systems, cloud-based storage systems, etc.).

In one embodiment, the ticket processor 510 receives a request for a ticket for traversing a POSIX® file system. In one embodiment, the ticket processor 510 executes an initial open_ticket_issuing_handle application programming interface (API). In one embodiment, the ticket processor 510 may encompass an application specific integrated circuit (ASIC). In one embodiment, a request to the initial open_ticket_issuing_handle API causes the cryptographic processor 515 to generate a secret random (and unique) key just for this handle instance, unique to a user ID and based on information, such as system identification, file system identification, time period (valid time period for the ticket), and any other unique information for the user and/or the system). The secret/unique or secure key value(K) is stored in memory 520 of the file system, and the user references K via the handle object. In one embodiment, a request for a ticket for traversing a file system invokes the open_ticket_issuing_handle API or ASIC. In one embodiment, K is generated once per major job, such as a file system backup or archive, etc.

In one embodiment, the cryptographic processor 515 generates an authentication code for the ticket using a numeric file identifier and the K. In one embodiment, each numeric file identifier value includes (inode, generation_number) obtained via the open_ticket_issuing_handle API is returned to the user with the authentication code. The ticket authentication code cannot be forged as it is cryptographically generated by cryptographic processor 515 of the file system and is only valid when used by the particular user and with the particular handle. In one embodiment, the authentication code (Tig) may be computed by using a cryptographic function on (inode, generation_number, padding) under the key K. Assuming the cryptographic function is resistant to plain text attacks, it should be "impossible" for a malicious user to fabricate a valid authentication code for the ticket. Knowledge of K is necessary to generate tickets for other (inode, generation_number) values and only the file system maintains the value of K. In one embodiment, the generation_number includes a generation date and time associated with the inode to distinguish inodes (as inode numbers may be reused at a later time by the file system). In other embodiments, a serial number or other particular identification number may be used.

In one embodiment, the ticket processor returns the ticket in response to a request to read files where the user has POSIX® x (execute) permissions according to directory permission bits or an access control list (ACL), and r permission to read the directory entries. The ticket information includes a numeric file tuple (inode, generation_number, Ticket identifier), where the ticket identifier is the authentication code.

In one embodiment, a user can open a directory for reading by providing a path, in which case permissions are checked according to the conventional POSIX® rules ("x" permissions along the path and "r" permission to the directory), or the user can open a directory for reading by providing an (inode, generation_number, Ticket identifier) tuple for the inode that represents the directory. The (inode, generation_number, Ticket identifier) ticket must have been previously issued to the user with the unique handle. The file system will "validate" the tuple using the validation processor 530 before completing the open_directory_with_ticket API. In one embodiment, validation is performed by the validation processor 530 by computing the ticket authentication code for (inode, generation_number) with the key K associated with the unique handle, and comparing the computed ticket authentication code with the ticket authentication code presented by the user API. If there is a mismatch in the comparison, the unique handle is revoked (forced closed). If the ticket is validated, a directory of the file system is opened for reading using the validated ticket information and the unique handle.

In one embodiment, a user can present a large list (e.g., hundreds, thousands, etc.) of ticket tuples (inode 1, generation_number 1, Ticket identifier 1), (inode 2, generation_number 2, Ticket identifier 2), . . . , (inode nnnn, generation_number nnnn, Ticket identifier nnnn) (where n is a positive integer ≥0) via a read_next_inodes_with_tickets API, and assuming all of the tickets are valid, receives back the content of the inodes (e.g., metadata and/or data). This invocation is similar to the existing general parallel file system's (GPFS's) GET_NEXT_INODE_BLOCK API, except in one embodiment the validation processor 530 "filters" the inodes in a given block, copying only the requested inodes (metadata and/or data) for which the user has valid tickets. In one example embodiment, the filter/copy processing does not require any more processing than the existing GPFS API, which performs a field by field copy, and which also performs filtering out inodes that are marked deleted/free. Distinguishable from the conventional systems, one or more embodiments require passing in the list of tuples into the daemon (rather than just a range of inode numbers) and having the daemon check the validity of the tuples. A list of tickets may be quickly tested for validity as described below.

In one embodiment, the list (inode 1, generation_number 1, padding), (inode 2, generation_number 2, padding), . . . , (inode nnnn, generation_number nnnn, padding) is created in a buffer (e.g., in memory 520) by the ticket processor 510 so that each inode is at a proper memory address boundary and the padding for each tuple is the length of a basic cryptographic/encryption block (e.g., 128 bits for advanced encryption standard (AES)). In one embodiment, the cryptographic processor 515 encrypts the buffer under key K using codebook mode to (re)generate the ticket authentication codes, which are compared against the ticket authentication codes passed via the API by the validation processor 530. In one example embodiment, additional speed of the processing may be gained by using memcpy( ), memcmp( ) functions to perform copies and compares of long lists of tuples and keys, etc.

In one embodiment, the ticket processor 510 generates multiple tickets for the unique handle for access to a block of dirents (directory entries), and receives a list for the block of dirents including the multiple tickets each including a tuple structure. Many ticket authentication codes may be computed by a single codebook mode call to the crypto library.

In one embodiment, to operate in parallel over multiple nodes, the unique handle needs to be transferred to another process on another node, for use against the same file system by the same user. In one embodiment, the transfer of the unique handle does not have to be very efficient since this unique handle transfer is performed once per "helper" process and is then used multiple times thereafter. In one example, the important values of the unique handle are packaged into a message: (user_id, group_id, secret Key, expiration_time, file system name, . . . ). In one embodiment, the message may be encoded by the cryptographic processor 515 and signed using secure sockets layer (SSL) public/private key technology; with keys already in use for security among the daemons in a cluster. Since the transferred unique handle message is encrypted and signed it can be passed back to the user via the API on one node, the master process may pass it to helpers on the same session it uses for other communications to the helpers. Each helper can pass the message to its local file system via the API and receive back a local unique handle that has the same function and authorizations as the original unique handle.

Figure 6A:
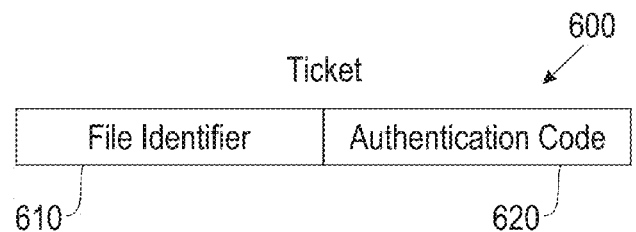
FIG. 6A is a block diagram illustrating a ticket data structure, according to an embodiment.

FIG. 6A is a block diagram illustrating a ticket data structure 600, according to an embodiment. In one embodiment, the ticket data structure 600 includes the file identifier 610 and the authentication code 620. In one embodiment, the file identifier 610 and the authentication code 620 each include one or more fields and has a size, such as 8 bytes. Other embodiments may have different sizes for the file identifier 610 and the authentication code 620, such as 16 bytes, etc.

Figure 6B:
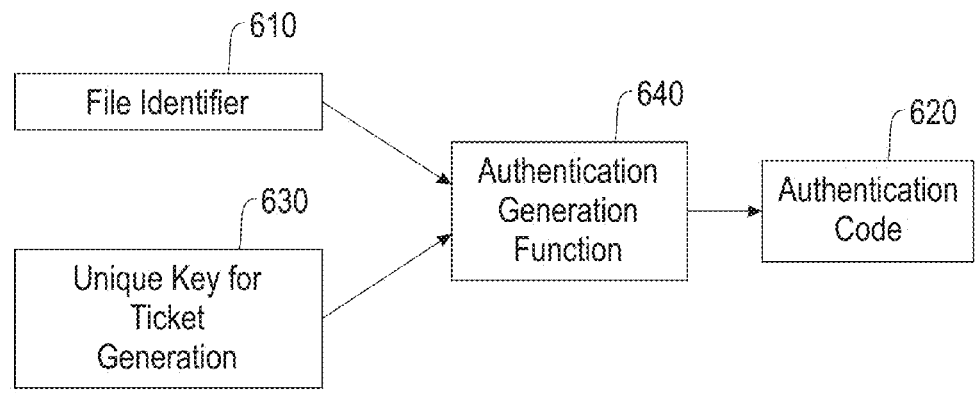
FIG. 6B is a block diagram illustrating a flow diagram for example ticket authentication code generation, according to an embodiment.

FIG. 6B is a block diagram illustrating a flow diagram for example ticket authentication code 620 generation, according to an embodiment. In one embodiment, the file identifier 610 and the unique key 630 (for the particular user, file system, system identifier, time period, etc.) are input into the authentication generation function 640, which uses a cryptographic function to compute the authentication code 620 for the ticket 600.

Figure 6C:
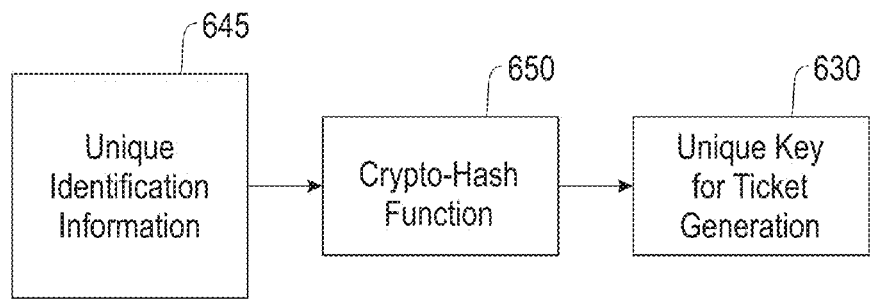
FIG. 6C is a block diagram illustrating a flow diagram for example unique key generation, according to an embodiment.

FIG. 6C is a block diagram illustrating a flow diagram for example unique key 630 generation, according to an embodiment. In one embodiment, the unique identification information 645 (e.g., unique user identification, system identification, file system identification, time period, etc.) is input into a crypto-hash function 650 to generate the unique key 630 that is used to generate the authentication code 620 for the ticket 600.

Figure 7:
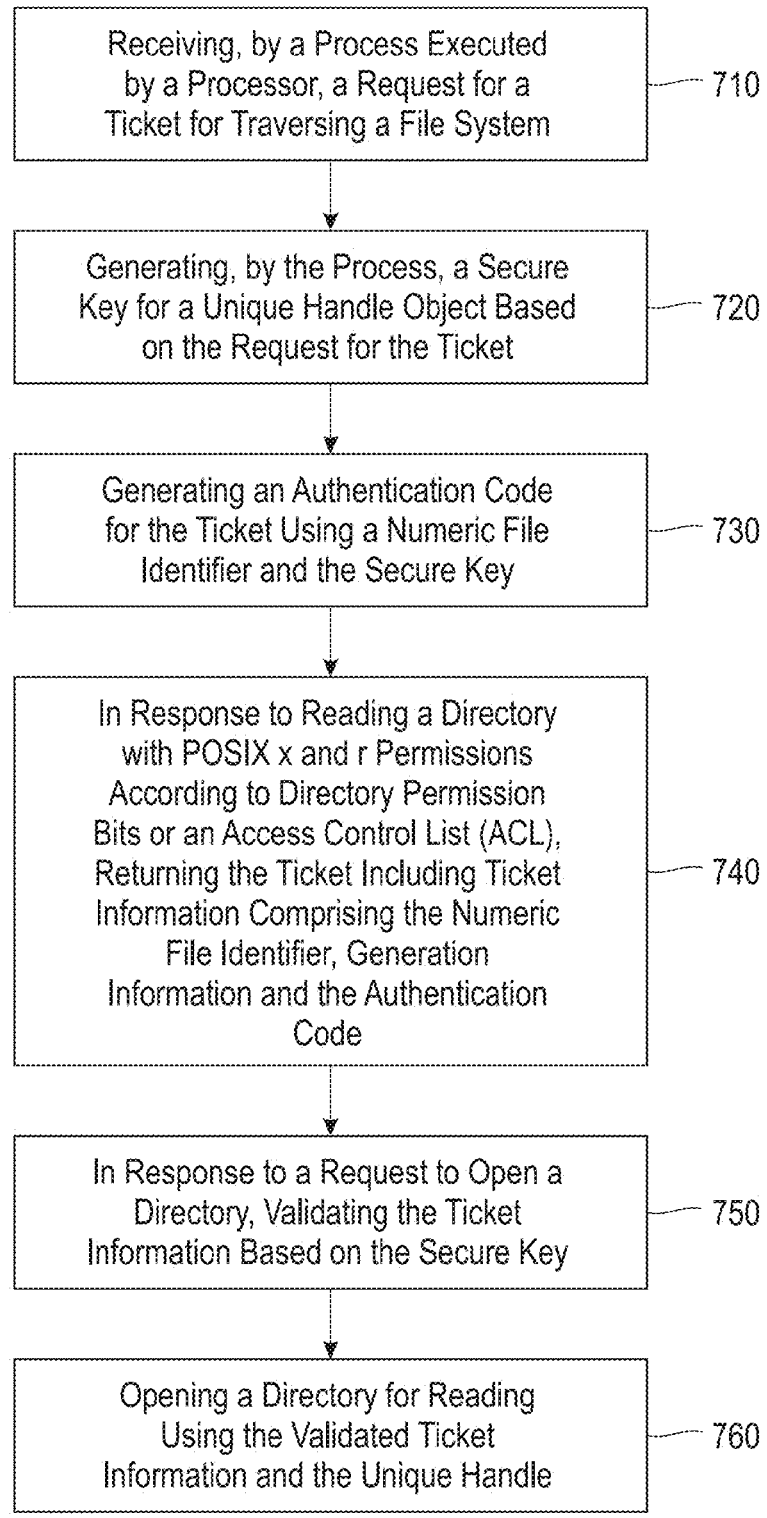
FIG. 7 illustrates a block diagram for a process for secure POSIX® directory traversing for opening and accessing files by inode number, according to one embodiment.

FIG. 7 illustrates a block diagram for a process 700 for secure portable operating system interface (POSIX) directory traversing for opening and accessing files by inode number, according to one embodiment. In one embodiment, in block 710 a request for a ticket for traversing a file system is received by a process (e.g., an API, a process on an ASIC, etc.) that is executed by a processor (e.g., ticket processor 510, FIG. 5). In block 720 the process generates a secure key for a unique handle (e.g., for a specific user having a user ID, system identification, file system identification, time period, etc.) object based on the request for the ticket. In block 730 an authentication code is generated for the ticket using a numeric file identifier (e.g., inode, generation_number) and the secure key. In block 740, in response to reading a directory with POSIX® x (for file) and r (for directory) permissions according to directory permission bits or an access control list (ACL), the ticket including ticket information is returned, where the ticket information includes the numeric file identifier, generation information and the authentication code (e.g., inode, generation_number, ticket identifier). In block 750, in response to a request to open a directory, the ticket information is validated based on the secure key. In block 760, a directory is opened for reading using the validated ticket information and the unique handle.

In one embodiment, process 700 may include that validating the ticket information includes regenerating an authentication code using the numeric file identifier, the generation information and the secure key, and comparing the authentication code with the regenerated authentication code. In one embodiment, process 700 may include that in response to a failure of validating the ticket information, the unique handle is revoked or closed.

In one embodiment, process 700 may include: generating multiple tickets for the particular handle for access to a block of inodes; a list is received for the block of inodes including the multiple tickets each including particular ticket information that includes a particular numeric file identifier, particular generation information and a particular authentication code; the multiple particular ticket information is validated for each of the multiple tickets; inodes of the block of inodes included in the plurality of tickets are filtered; and only requested inodes included in the multiple tickets for which validated particular ticket information exists are copied.

In one embodiment, process 700 may include validating the multiple particular ticket information by passing the list into a read next inodes with tickets process. In one embodiment, process 700 may include creating the list of tickets in a buffer device in a structure having the particular numeric file identifier, the particular generation information and padding (e.g., inode n, generation_number n, padding), where n is a positive integer, for the particular authentication code for placing each inode at a proper memory address boundary. Each numeric file identifier (inode number, generation number) is placed at a block boundary, with sufficient padding (e.g., a selected constant bit pattern) added such that the length of the file identifier plus the length of the padding is the length of the basic encryption block, which aligns the next ticket, etc. The buffer may be encrypted under the secure key using codebook mode to regenerate the particular authentication codes. The multiple ticket information may be validated for each of the multiple tickets by comparing the particular authentication codes with the regenerated particular authentication codes.

In one embodiment, process 700 may further include generating multiple tickets for the particular handle for access to a block of dirents; receiving a list for the block of dirents including the plurality of tickets each including particular ticket information that includes a particular numeric file identifier, particular generation information and a particular authentication code; validating the multiple particular ticket information for each of the multiple tickets; filtering dirents of the block of dirents included in the multiple tickets; and copying only requested dirents included in the multiple tickets for which validated particular ticket information exists.

In one embodiment, process 700 may additionally include operating the process in parallel over multiple computing nodes based on transferring the unique handle to one or more other processes on the multiple computing nodes by: packaging handle values into a message. The handle values may include user identification, group identification, the secure key, expiration time, and file system identification. The message is encrypted and signed using SSL public and private key encryption using security keys used in a particular cluster. A helper process passes the message to its local file system via the process and receives a local handle that has a same function and authorizations as the particular handle.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving, by a process executed by a processor, a request for a ticket for traversing a file system;
    generating, by the process, a secure key for a unique handle based on the request for the ticket;
    generating an authentication code for the ticket using a numeric file identifier and the secure key;
    in response to reading a directory with portable operating system interface (POSIX) x (execute) and r (read) permissions according to directory permission bits or an access control list (ACL), returning the ticket including ticket information comprising the numeric file identifier, generation information and the authentication code;
    in response to a request to open a directory, validating the ticket information based on the secure key by: regenerating the authentication code using the numeric file identifier, the generation information and the secure key, and comparing the authentication code with the regenerated authentication code;
    opening a directory for reading using the validated ticket information and the unique handle; and
    generating a plurality of tickets for the unique handle for access to a block of elements.

2. The method of claim 1, further comprising:
    in response to a failure of validating the ticket information, revoking the unique handle.

3. The method of claim 2, further comprising:
    for the block of elements comprising a block of inodes:
        receiving a list for the block of inodes including the plurality of tickets each including particular ticket information that comprises a particular numeric file identifier, particular generation information and a particular authentication code;
        validating the plurality of particular ticket information for each of the plurality of tickets;
        filtering inodes of the block of inodes included in the plurality of tickets; and
        copying only requested inodes included in the plurality of tickets for which validated particular ticket information exists.

4. The method of claim 3, wherein validating the plurality of particular ticket information comprises passing the list into a read next inodes with tickets process.

5. The method of claim 4, further comprising:
    creating the list of tickets in a buffer device in a structure having the particular numeric file identifier, the particular generation information and padding for the particular authentication code for placing each inode at a proper memory address boundary, wherein the padding in the structure is selected such that a length of the particular numeric file identifier added to a length of the padding is a length of a basic encryption block; and
    encrypting the buffer under the secure key using codebook mode to regenerate the particular authentication codes.

6. The method of claim 1, further comprising:
    for the block of elements comprising a block of dirents:
        receiving a list for the block of dirents including the plurality of tickets each including particular ticket information that comprises a particular numeric file identifier, particular generation information and a particular authentication code;
        filtering dirents of the block of dirents included in the plurality of tickets; and
        copying only requested dirents included in the plurality of tickets for which validated particular ticket information exists.

7. The method of claim 6, further comprising:
    operating the process in parallel over multiple computing nodes based on transferring the unique handle to one or more other processes on the multiple computing nodes by:
        packaging handle values into a message, wherein the handle values comprise user identification, group identification, the secure key, expiration time, and file system identification; and
        encrypting and signing the message using secure sockets layer (SSL) public and private key encryption using security keys used in a particular cluster, wherein a helper process passes the message to its local file system via the process and receives a local handle that has a same function and authorizations as the unique handle.

8. A computer program product for secure portable operating system interface (POSIX) directory traversing for opening and accessing files by inode number, the computer program product comprising a computer readable storage device having program instructions embodied therewith, the program instructions executable by a processor to cause the processor to:
    receive, by the processor, a request for a ticket for traversing a file system;
    generate, by the processor, a secure key for a unique handle based on the request for the ticket;
    generate, by the processor, an authentication code for the ticket using a numeric file identifier and the secure key;
    in response to reading a directory with POSIX x and r permissions according to directory permission bits or an access control list (ACL), return, by the processor, the ticket including ticket information comprising the numeric file identifier, generation information and the authentication code;
    in response to a request to open a directory, validate, by the processor, the ticket information based on the secure key by regenerating the authentication code using the numeric file identifier, the generation information and the secure key, and comparing the authentication code with the regenerated authentication code;

open, by the processor, a directory for reading using the validated ticket information and the unique handle; and generate, by the processor, a plurality of tickets for the unique handle for access to a block of elements.

9. The computer program product of claim 8, further comprising program instructions executable by the processor to cause the processor to:

in response to a failure of validating the ticket information, revoke the unique handle.

10. The computer program product of claim 9, further comprising program instructions executable by the processor to cause the processor to:

for the block of elements comprising a block of inodes:
generate, by the processor, a plurality of tickets for the unique handle for access to a block of inodes;
receive, by the processor, a list for the block of inodes including the plurality of tickets each including particular ticket information that comprises a particular numeric file identifier, particular generation information and a particular authentication code;
filter, by the processor, inodes of the block of inodes included in the plurality of tickets; and
copy, by the processor, only requested inodes included in the plurality of tickets for which validated particular ticket information exists.

11. The computer program product of claim 10, further comprising program instructions executable by the processor to cause the processor to:

create, by the processor, the list of tickets in a buffer device in a structure having the particular numeric file identifier, the particular generation information and padding for the particular authentication code for placing each inode at a proper memory address boundary, wherein the padding in the structure is selected such that a length of the particular numeric file identifier added to a length of the padding is a length of a basic encryption block;
encrypt, by the processor, the buffer under the secure key using codebook mode to regenerate the particular authentication codes.

12. The computer program product of claim 8, further comprising program instructions executable by the processor to cause the processor to:

for the block of elements comprising a block of dirents:
generate, by the processor, a plurality of tickets for the unique handle for access to a block of dirents;
receive, by the processor, a list for the block of dirents including the plurality of tickets each including particular ticket information that comprises a particular numeric file identifier, particular generation information and a particular authentication code;
filter, by the processor, dirents of the block of dirents included in the plurality of tickets; and
copy, by the processor, only requested dirents included in the plurality of tickets for which validated particular ticket information exists.

13. The computer program product of claim 8, further comprising program instructions executable by the processor to cause the processor to:

operate the process in parallel over multiple computing nodes based on transferring the unique handle to one or more other processes on the multiple computing nodes by:

packaging handle values into a message, wherein the handle values comprise user identification, group identification, the secure key, expiration time, and file system identification; and encrypting and signing the message using secure sockets layer (SSL) public and private key encryption using security keys used in a particular cluster, wherein a helper process passes the message to its local file system via the process and receives a local handle that has a same function and authorizations as the unique handle.

14. An apparatus comprising:

a ticket hardware processor configured to receive a request for a ticket for traversing a file system;

a cryptographic hardware processor configured to generate a secure key for a unique handle based on the request for the ticket, and to generate an authentication code for the ticket using a numeric file identifier and the secure key;

the ticket hardware processor further configured to return the ticket including ticket information in response to a request to read a directory with portable operating system interface (POSIX) x (execute) and r (read) permissions according to directory permission bits or an access control list (ACL), wherein the ticket information comprises the numeric file identifier, generation information and the authentication code;

a validation hardware processor configured to validate the ticket information based on the secure key in response to a request to open a directory by: regenerating the authentication code using the numeric file identifier, the generation information and the secure key, and comparing the authentication code with the regenerated authentication code; and the ticket hardware processor is further configured to generate a plurality of tickets for the unique handle for access to a block of elements;

wherein a directory of the file system is opened for reading using the validated ticket information and the unique handle.

15. The apparatus of claim 14, wherein:

the cryptographic hardware processor is configured to regenerate the authentication code using the numeric file identifier, the generation information and the secure key; and in response to a failure of validating the ticket information, the ticket hardware processor is configured to revoke the unique handle.

16. The apparatus of claim 15, wherein:

the block of elements comprises a block of inodes;

the ticket hardware processor is configured to generate a plurality of tickets for the unique handle for access to the block of inodes, receive a list for the block of inodes including the plurality of tickets each including particular ticket information that comprises a particular numeric file identifier, particular generation information and a particular authentication code;

the validation hardware processor is configured to filter inodes of the block of inodes included in the plurality of tickets, and copy only requested inodes included in the plurality of tickets for which validated particular ticket information exists.

17. The apparatus of claim 16, wherein:

the ticket hardware processor is configured to create the list of tickets in a buffer device in a structure having the particular numeric file identifier, the particular generation information and padding for the particular authentication code for placing each inode at a proper memory address boundary, wherein the padding in the structure is selected such that a length of the particular numeric file identifier added to a length of the padding is a length of a basic encryption block; and the cryptographic hardware processor is configured to encrypt the buffer under the secure key using codebook mode to regenerate the particular authentication codes.

18. The apparatus of claim 17, wherein:

the block of elements comprises a block of dirents;

the ticket hardware processor is configured to generate a plurality of tickets for the unique handle for access to the block of dirents, and receive a list for the block of dirents including the plurality of tickets each including particular ticket information that comprises a particular numeric file identifier, particular generation information and a particular authentication code; and the validation hardware processor is configured to filter dirents of the block of dirents included in the plurality of tickets, and copy only requested dirents included in the plurality of tickets for which validated particular ticket information exists.

* * * * *